SIGNAL CORRECTION CIRCUITS

Original Filed Oct. 1, 1952

INVENTORS
GEORGE C. SZIKLAI
& ALFRED C. SCHROEDER

BY [signature]
ATTORNEY

United States Patent Office 3,013,116

Patented Dec. 12, 1961

3,013,116
SIGNAL CORRECTION CIRCUITS

George C. Sziklai, Princeton, N.J., and Alfred C. Schroeder, Southampton, Pa., assignors to Radio Corporation of America, a corporation of Delaware Continuation of application Ser. No. 312,598, Oct. 1, 1952. This application Nov. 26, 1958, Ser. No. 776,643
6 Claims. (Cl. 178—7.5)

This invention relates to the reinsertion of direct current (D.C.) and/or low frequency components of electrical signals, and particularly, but not exclusively, to the reinsertion of such components in a television system. This application is a continuation of application Serial No. 312,598, filed October 1, 1952, now abandoned.

Various circuits have been proposed for reinsertion of the above-mentioned components where the components have been suppressed during transmission, as, for example, where they are suppressed by transformers or by alternating current amplifiers. These circuits depend for their operation upon the transmission of periodically recurring control pulses which are caused to go to a fixed voltage level, such as "black," in a picture, or a few volts beyond "black" before the said components have been suppressed. In television systems, these recurring pulses usually are the blanking and synchronizing pulses. An excellent discussion of the problem of D.C. insertion with analysis of various suggested forms of reinserting circuits is contained in an article entitled "Television D.C. Component" by Karl R. Wendt, commencing on page 85 of the March 1948 issue of the RCA Review.

Among the various proposed circuits are the so-called "keyed" or "clamp" circuits of which the circuit described in U.S. Patent No. 2,299,945 to Wendt is an example. In general, "keyed" circuits have advantages over other forms of D.-C. restorers in that they can be very fast operating with low distortion and high noise immunity, and can operate satisfactorily with signal levels much lower than those required for other forms of restorers.

In the double keyed diode type of clamp circuit as described in the aforesaid patent to Wendt, the charge of the coupling capacitor in the grid circuit of the tube which is to have the reinserted D.C. component in its output is controlled by means of two diodes which are keyed by periodically recurring pulses, such as synchronizing pulses. Upon the occurrence of a synchronizing or keying pulse, one of the diodes is rendered conducting and the capacitor will discharge therethrough a certain amount if its charge should be reduced to provide the correct D.C. reinsertion, or it will charge a certain amount through the other diode if its charge should be increased. Between keying pulses, both diodes are held non-conducting by means of a biasing voltage.

Another known type of clamp circuit which is also "bidirectional" (i.e. the charge on the coupling capacitor may be increased or decreased during the clamp interval) employs two keyed triodes instead of two keyed diodes. This keyed double triode type of reinserting circuit is described by the M.I.T. Radar School Staff on pages 2–35 et seq. of "Principles of Radar," published by McGraw-Hill Book Company, 1946 edition. Another simpler form of clamp circuit is the single keyed diode or unbalanced clamp circuit which is described in U.S. Patent No. 2,299,944 of Wendt. Its operation is somewhat similar to the double keyed diode circuit but it employs only a single keyed diode, utilizing the grid-cathode path of the tube being clamped as the additional diode.

While these three known types of clamp circuits mutually possess the general advantages of "keyed" circuits such as capability for high speed operation with low distortion and high noise immunity, and low signal level requirements, there are various advantages and disadvantages peculiar to each form which differentiate the desirability and applicability of each. The double keyed diode circuit can be balanced so that keying pulses will not appear on the signal; also the clamping level can be easily adjusted, and the circuit can be used with equal ease to clamp on positive or negative peaks of the signal. However, disadvantages to the use of the double keyed diode circuit include the complication of providing synchronous keying pulses of opposite polarities to effect push-pull keying of the two diodes, and the requirement that the keying pulses must be of greater amplitude than the signal in order that a bias may be used that will insure that neither diode conducts between keying pulses. The keyed double triode circuit requires keying pulses of only one polarity, and the keying pulses need not be as large as the signal if negative peaks of the signal are clamped. However, since the keyed double triode circuit is not balanced some keying pulse component will appear on the signal; also the clamping level cannot be adjusted easily. While the single keyed diode circuit is the simplest of the three types, the circuit can be used only for clamping on positive peaks of the signal; the clamping level is not adjustable but fixed at the cathode potential of the tube being clamped; and the circuit is inherently unbalanced with the result that some of the pulse will be applied to the signal.

The present invention is an improved signal correction circuit of the clamp type which combines many of the advantages of the known types of clamp circuits as set forth above. Relying upon the bidirectional switch properties of a junction transistor, as revealed in the copending application of George C. Sziklai, Serial No. 308,618, filed on September 9, 1952, now Patent No. 2,728,857, granted December 27, 1955, and entitled "Electronic Switching," this invention employs a single junction transistor as a bidirectional switch in the grid circuit of the tube to be clamped. Periodically, keying pulses applied to the base electrode of the junction transistor render the emitter-collector path of the transistor conductive for a clamping interval. Since current may then flow therethrough in either direction, as discussed in the aforesaid application, the single transistor emitter-collector path serves alternatively as a charging or discharging path for the coupling capacitor in the grid circuit of the tube to be clamped.

It will be seen that while the present invention provides a D.C. restorer capable of fast, essentially distortionless, noise-free operation over a wide range of signal levels, it is exceptionally simple in form. The clamp circuit of the present invention requires keying pulses of only one polarity. The circuit may have the advantage of "balanced" arrangements in that a keying pulse component will not appear on the clamped signal. The clamping level can be easily adjusted over a substantial range, and the circuit may be used to clamp on either positive or negative peaks of the signal.

It is an object of the present invention to provide improved direct current and/or low frequency components reinserting or correcting apparatus and, especially, improved and simplified reinserting apparatus of the "keyed" type.

A further object of the present invention is to provide an improved and simplified signal correction circuit of the type in which a condenser in the circuit is "keyed" for both charge and discharge.

An additional object of the present invention is to provide a television system with an improved and simplified D.C. reinsertion circuit of the clamp type.

Another object of the present invention is to provide a television receiver with a simple clamp circuit for restoring D.C. and/or low frequency components to a video signal.

A further object of the invention is to provide a simple clamp circuit employing a junction transistor as a bidirectional switch.

An additional object of the invention is to provide a simple D.C. restorer of the "keyed" type which requires keying pulses of only one polarity.

Another object of the invention is to provide a D.C. reinsertion circuit, capable of high speed operation with low distortion and high noise immunity, which is simple, accurate and stable.

Other and incidental objects and advantages of the invention will be apparent to those skilled in the art from a reading of the following specification and an inspection of the accompanying drawings in which.

Figures 1, 2:
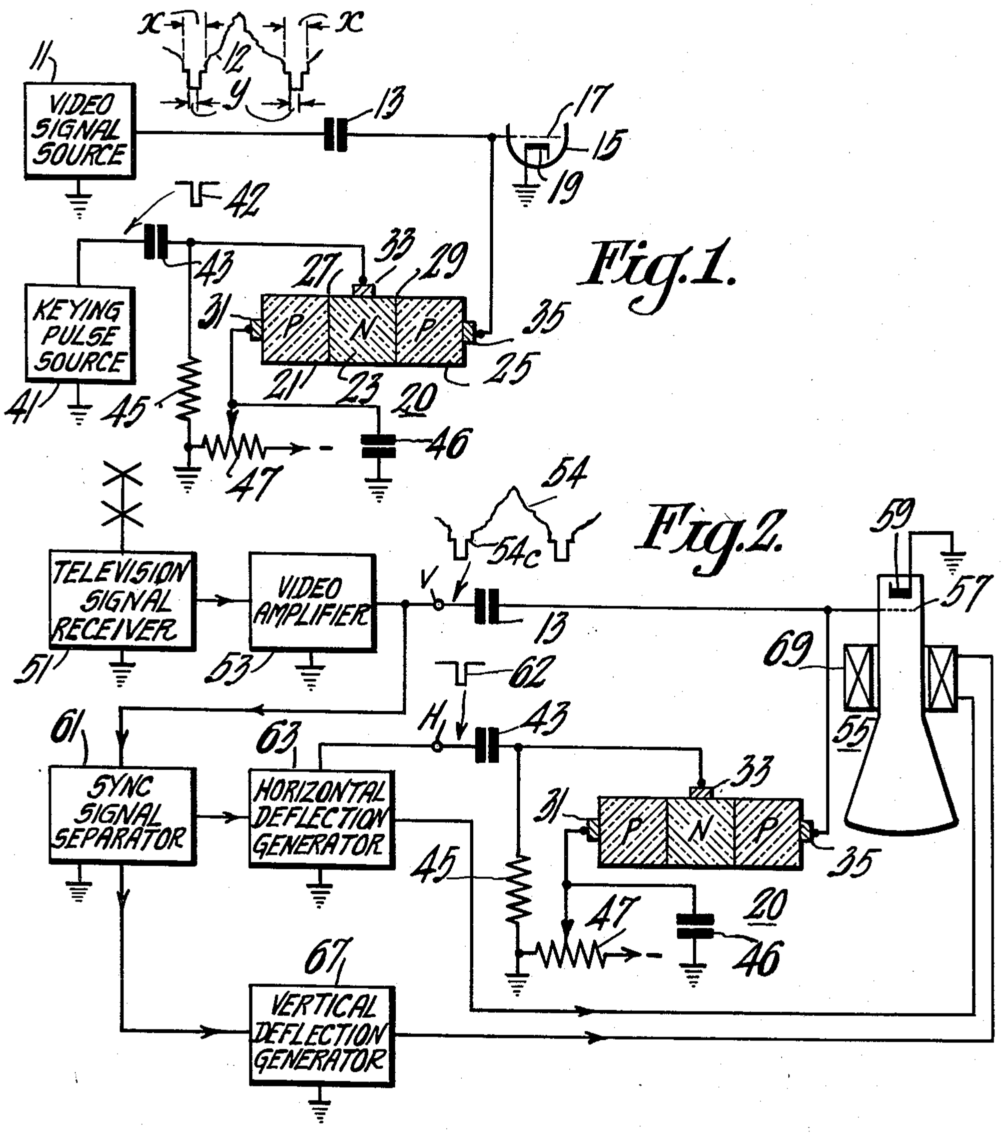
FIG. 1 is a schematic circuit diagram of a signal correction circuit, illustrating an embodiment of the present invention employing a p-n-p junction transistor.
FIG. 2 is a schematic circuit diagram showing the embodiment illustrated in FIG. 1 as applied to use in a television receiver.

In FIG. 1 a source 11 of video signals is coupled by a capacitor 13 to an input terminal or electrode 17 of a subsequent stage or utilization device in a video signalling system. The source 11 may be some stage of a television transmitter or receiver, for example, the video signal output of which has lost or erroneously represents its D.C. and/or low frequency components. The stage incorporating input electrode 17 may then be, for example, some subsequent utilization device or operator upon the video signal, such as the modulating amplifier in a transmitter or the image reproducing device in a receiver, for which it is desirable or requisite that the video signal input thereto contain the proper D.C. and low frequency components. The input electrode 17 may be the control grid of an electron tube 15, as shown, or may, for example, be the input electrode of a transistor.

The video signal wave 12 appearing as the output of source 11 has periodically recurring control periods "*x*," such as the blanking intervals in a television signal, during which occur periodic reference and control signals, such as blanking and synchronizing pulses. As in other forms of keyed restorers a source 41 supplies periodically recurring keying pulses 42 to key into operation, during a selected portion of each control period, a circuit for adjusting the charge on capacitor 13 whereby the grid 17 of tube 15 may be brought to the same predetermined potential (i.e. the "clamping level") during each control period. The keying pulses 42 may be derived in source 41 from synchronizing pulses separated from the video signal 12, or may be derived from flyback pulses occurring in defection wave generators driven by such separated synchronizing pulses, or may be derived in some other manner from other apparatus associated with the particular video signalling system in which the invention is employed. Whatever the nature of the derivation of the keying pulses 42, it is essential that the keying pulses 42 occur synchronously with some flat, recurrent, reference level portion of the video signal, such as the synchronizing pulse peaks or the "back porch" portions of the blanking pedestals.

The charge adjusting circuit of the present invention is unique in that a single electrical path serves alternatively as a charging and discharging path for the capacitor 13. This is made possible by utilization of the bidirectional current characteristics of a junction transistor, as revealed in the aforesaid copending Sziklai application.

A junction transistor 20 of the p-n-p type is shown in FIG. 1. The transistor 20 comprises a body of semiconductive material, such as germanium or silicon, having two p-type regions 21 and 25, separated by and contiguous with opposite surfaces of an n-type region 23. Electrical "barriers," as discussed in U.S. Patent No. 2,569,347 to William Shockley, issued on September 25, 1951, occur at the interfacial junctions 27, 29. The electrodes 31, 33 and 35, by which external circuit connections are made to the respective regions 21, 23, 25, make essentially ohmic (non-rectifying) contacts with their respective regions. The practitioner of the present invention who should desire a theoretical background on junction transistors in general may refer to the aforesaid Shockley patent and to the following publications for a preliminary knowledge of the nature of the junction transistor, some of its better known characteristics, and projected theories of its operation: "The Theory of p-n Junctions in Semiconductors and p-n Junction Transistors" by W. Shockley, appearing in Volume 28 (1949) of the Bell System Technical Journal, starting at page 435; "Electrons and Holes in Semiconductors" by W. Shockley, published by D. Van Nostrand Co. in 1950; "p-n Junction Transistors" by W. Shockley, M. Sparks, and G. K. Teal, appearing in Volume 83 of the Physical Review, starting at page 151 in the July 1, 1951, issue; "Some Circuit Properties and Applications of n-p-n Transistors" by R. L. Wallace, Jr. and W. J. Pietenpol, appearing in Volume 39 of the Proceedings of the I.R.E., starting at page 753 in the July 1951 issue.

In accordance with conventional nomenclature in the transistor field, the electrodes 31, 33, and 35 will be referred to as emitter, base, and collector, respectively. However, it will be appreciated, particularly in view of the bidirectional character of the current flow through the emitter-collector path of the transistor 20, that the designation of electrode 31 as emitter and electrode 35 as collector is essentially arbitrary and not intended to be restrictively indicative of their respective functions.

In the circuit shown in FIG. 1 the collector electrode 35 is connected directly to the grid 17 of the tube 15, the cathode 19 thereof being connected to ground. The emitter electrode 31 of the transistor 20 is adjustably connected to a point of reference potential, negative relative to ground, such as via an adjustable tap to a point on a voltage dividing resistor 47 connected between ground and a source of negative potential. The base electrode 33 is returned to ground via a resistor 45. There is thus established a bias in the reverse direction between base 33 and emitter 31, which renders the emitter-collector path of the transistor 20 normally non-conductive.

However, whenever a keying pulse 42, of negative potential relative to ground, is applied from source 41 via capacitor 43 to the base electrode 33, the reverse bias is overcome and a "bias" in the forward direction is temporarily established between base 33 and emitter 31 which renders the emitter-collector path of the transistor 20 conductive for the duration of the keying pulse 42. A by-pass capacitor 46 may be provided between the emitter 31 and ground to avoid degenerative coupling between the base-emitter and emitter-collector circuits, and to render the clamping operation substantially insensitive to variations in keying pulse amplitude. As has been stated before, the keying pulses 42 are synchronously timed to coincide with some flat recurrent portions of the signal wave 12 (e.g. portions of the control signals which occur during control period "*x*," such as synchronizing pulse peaks or "back porch" portions of blanking pedestals if signal 12 is a conventional composite television signal). While in many television applications of the present invention it will be preferable to key during "back porch" blanking intervals, for purposes of explanation it will be assumed that the keying pulses 42 are timed to occur during the ultimate pulse peaks of the video signal wave 12. Further, since it is prudent in avoiding erroneous level setting to provide that the keying pulse will not last beyond the selected signal reference level, it will be assumed that the keying pulses 42 are timed to coincide with the portions "*y*" of the ultimate pulse peaks occurring during control periods "*x*" of the signal wave 12.

Thus, during each recurrent interval "y" of the signal 12, the emitter-collector path of the transistor 20 is rendered conductive by the action of a keying pulse 42, and current will flow therethrough in either direction, the direction of flow depending upon the polarity of the potential difference between the signal level at grid 17 and the reference potential or "clamping level" voltage (which is determined by the tap selection on divider 47 of the emitter electrode potential). If the D.C. component were present in the signal output of source 11, the signal 12 should appear at the grid 17 at the same level during each reference interval "y." But, when the signal has suffered the loss of its D.C. component as under the conditions assumed here, the signal level at grid 17 during reference intervals "y" varies with the degree of signal swing between reference intervals. However, by adjusting the charge on the coupling capacitor 13 the necessary amount to bring the grid 17 to the selected "clamping level" during each reference interval, and by holding the charge at its adjusted value until the subsequent reference interval, the signal output of tube 15 includes the proper D.C. component.

Thus, if the signal level at grid 17 at the beginning of a reference or clamping interval "y" is greater in magnitude than the clamping level voltage, then the capacitor 13 will discharge through the emitter-collector path of transistor 20 during the clamping interval until the potential of grid 17 is brought equal to the clamping level; but if the signal level at grid 17 at the beginning of a clamping interval "y" is smaller in magnitude than the clamping level voltage, then a charging current will flow in the opposite direction through the emitter-collector path during the clamping interval until the potential of grid 17 is brought equal to the clamping level. As the keying pulse ends, the base-emitter circuit of the transistor 20 returns to a reverse bias condition and the emitter-collector path returns to a non-conductive state, leaving no path for current flow to change the charge on capacitor 13. As the content of the signal portions intervening the reference intervals varies, the charge of the capacitor 13 is adjusted the proper amounts and in the appropriate directions by the keyed circuit to continually return the grid 17 to the clamping level each reference interval.

It may be appreciated that it would be desirable, though not essential, that the junction transistor 20 employed in the present invention be "symmetrical" in the sense discussed in the aforementioned copending application of Sziklai: i.e. that current characteristics for both directions of current flow through the emitter-collector path be essentially symmetrical. Not all junction transistors attain this condition of symmetry; primarily as a consequence of the particular procedure employed in their fabrication or development, some junction transistors present a substantially greater impedance to current flow in one direction between the outer zones, for a given set of bias conditions, than they present to current flow in the opposite direction between the outer zones under equivalent bias conditions.

While there are many contributing factors which may determine the presence or lack of such symmetry in a junction transistor, it is believed by the applicants that if the resistivities of the two outer zones are substantially equal and if the two junctions are symmetrical (i.e. if the junction between one outer zone and the intermediate zone is substantially equal in magnitude or extent to the junction between the other outer zone and the intermediate zone) a sufficient degree of symmetry in current characteristics is achieved to permit consideration of the unit as a "symmetrical" junction transistor.

Thus it should be stated that, though successful clamping action may be achieved with the present invention using "asymmetrical" transistor units, the circuit is operated to full advantage with maximum accuracy if the transistor 20 is a substantially "symmetrical" unit.

A particular application of the present invention to use in a television receiving system is shown in FIG. 2. A conventional television signal receiver 51 is provided for receiving and demodulating a transmitted television carrier wave. Briefly, it may comprise carrier wave amplifying apparatus, a frequency converter, and a signal detector by means of which composite television signals, including video and control signals, such as synchronizing and blanking pulses, are recovered from the carrier wave. A conventional video amplifier 53, coupled in the usual manner to signal receiver 51, amplifies the composite signal output of the receiver.

The video amplifier 53 is capacitively coupled by condenser 13 to the input electrode 57 of an image reproducing device 55, which may be a kinescope of conventional type, having the customary components such as a deflection yoke 69 and an electron gun including a cathode 59 and control grid 57. Also coupled to the video amplifier 53 is the sync signal separator 61, which functions in the usual way to separate the horizontal and vertical synchronizing pulses from the video signals and also from one another.

The separated horizontal and vertical synchronizing pulses are impressed respectively upon horizontal deflection generator 63 and vertical deflection generator 67. These generators also function in the usual manner to produce respectively sawtooth wave energy at horizontal and vertical deflection frequencies for control, via deflection yoke 69, of the electron beam deflection in the image reproducing device 55.

As in the previously described diagram, a junction transistor 20 is provided, having emitter, base and collector electrodes, 31, 33, and 35 respectively. The emitter 31 is adjustably connected to a point of negative potential as by means of a tap on voltage divider 47, the latter being connected between ground and a source of negative potential. A by-pass capacitor 46 may be connected between the emitter 31 and ground. The collector 35 is connected to grid 57, the beam intensity control electrode of the image reproducing device 55. Cathode 59, the electron emitter of image reproducing device 55, is connected to ground. The base electrode 33 of the transistor 20 is also returned to ground via resistor 45.

With the connections of the transistor electrodes as shown, there is established a bias in the reverse direction between base 33 and emitter 31, which render the emitter-collector path of the transistor 20 normally non-conductive. However, when a negative keying pulse 62, appearing at terminal "H" of the horizontal deflection generator 63, is applied via capacitor 43 to the base electrode, the reverse bias is overcome and a "bias" in the forward direction is temporarily established between base 33 and emitter 31 which renders the emitter-collector path of the transistor 20 conductive bidirectionally for the duration of the keying pulse 42.

In the system shown in FIG. 2 the periodic keying pulses 62 may be derived from the flyback pulses which normally occur in the operation of conventional deflection generators, such as the horizontal deflection generator 63. Time delay and wave shaping apparatus may be required in operation on the flyback pulses to suitably time the derived keying pulses 62 to occur during the desired portions of the television signal's control periods. As a practical example, each keying pulse 62 may be timed to occur during a selected interval of the "back porch" blanking pedestal 54c of the television signal 54, appearing in the output of the video amplifier 53. If this is the selected mode of operation, then periodically as a "back porch" blanking portion 54c of the signal 54 appears at grid 57 of the reproducing device 55, a keying pulse 62 synchronously occurs to key the emitter-collector path of transistor 20 into a conductive state. If there is any potential difference between the signal level at grid 57 and the selected clamping level voltage (determined by the tap selection of the potential of emitter 31) at this time, the capacitor 13 will be subject to either a charging or a discharging action via the emitter-collector path of transistor 20, whichever is required to bring the grid 57 to the clamping level voltage. Thus the brightness of picture elements will be properly represented in the image reproduced by device 55, despite variations in background illumination of the original scene, due to the action of the keyed correction circuit in adjusting the charge of coupling capacitor 13 to continually bring the signal level for "back porch" blanking pedestals 54*c* (representative of picture "black") to a fixed clamping level, and holding the charge of the capacitor 13 at the adjusted value throughout each subsequent video signal interval.

The marked advantages of the present invention as a clamp circuit for restoring to a video signal the D.C. component, which it has lost while passing through apparatus such as a conventional A.C. coupled video amplifier, are readily apparent. Fast, essentially distortionless, noise-immune operation is achieved with a very simple circuit, requiring a single junction transistor; keying pulses of only one polarity are required. The clamping level is easily adjusted, as by changing the potential of the emitter electrode 31 in the illustrated embodiment. The circuit may be used with signals of either polarity (e.g. the circuit may be used for clamping in television stages where the sync and blanking pulses in the signal input extend in the positive direction as well as in stages, such as that shown in FIG. 2, where the sync and blanking pulses in the signal input extend in the negative direction). Also, particularly where a "symmetrical" transistor is used, as discussed previously, the clamped signal will be essentially free of any keying pulse component.

Figure 3:
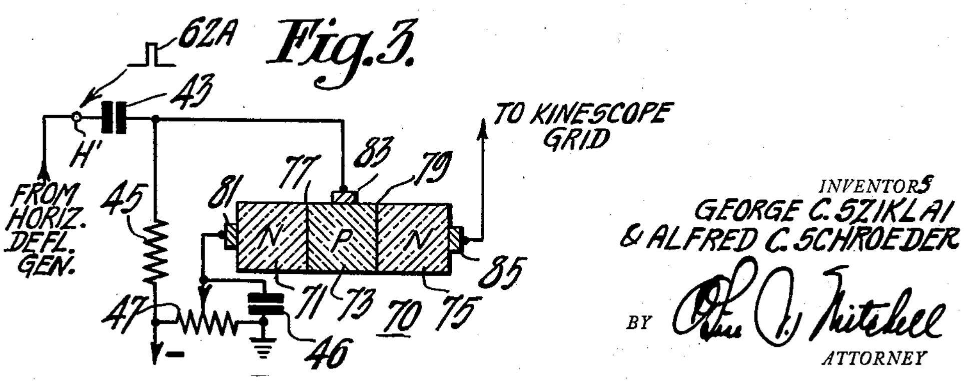
FIG. 3 is a schematic circuit diagram illustrating another embodiment of the present invention employing an n-p-n junction transistor and applicable to use in the television receiver shown in FIG. 3.

FIG. 3 has been included in the drawings to illustrate that junction transistors of the n-p-n type may be employed in the present invention as well as junction transistors of the p-n-p type. A junction transistor 70 is illustrated, having two n-type zones 71 and 75, separated by and contiguous with opposite surfaces of a p-type zone 73, the inter-zone junctions being designated as 77 and 79, respectively. The emitter, base and collector electrodes, 81, 83, and 85, respectively, by which external circuit connections are made to the respective regions 71, 73, and 75, make essentially ohmic (non-rectifying) contacts with their respective regions.

In substituting the n-p-n circuit of FIG. 3 for the keyed p-n-p circuit in FIG. 2, the collector 85 is connected to the grid 57 of the image reproducing device 55. The emitter 81 is adjustably connected to a point of negative potential, as by a tap on the voltage divider 47, which is connected between ground and a source of negative potential. As in the previously described diagrams, a by-pass capacitor 46 may be connected between the emitter 81 and ground. A bias in the reverse direction between base 83 and emitter 81 is established by returning the base 83 via resistor 45 to the negative end of the voltage divider 47. To periodically overcome this reverse bias and thus render the emitter-collector path temporarily conductive, the keying pulses 62A, which are applied from terminal "H'" to the base 83 via the capacitor 43, must be of positive polarity, as contrasted with the negative pulses required in the p-n-p circuit. The keying pulses 62A also may be derived from the periodic flyback pulses occurring in the operation of the horizontal deflection generator 63 and timed to occur during the desired reference level portions of the signal 54.

Operation of the n-p-n circuit in the receiving system of FIG. 2 is similar to the previously described operation of the p-n-p circuit. Thus, when each blanking pedestal 54*c* appears at grid 57, a keying pulse 62A keys the emitter-collector path transistor 70 into its (bidirectionally) conductive stage. If the signal level at grid 57 differs from the clamping level voltage (determined by the selected potential of emitter 81), current will flow through the emitter-collector path of transistor 70 in the appropriate direction to adjust the charge on capacitor 13 to bring the grid 57 to the clamping level. When keying pulse 62A ends, the base-emitter circuit of transistor 70 returns to a reverse bias condition, and the emitter-collector path of transistor 70 returns to a nonconductive state, leaving no path for current flow to change the charge on capacitor 13 until the occurrence of the next keying pulse.

What is claimed:

1. In a circuit for correction of a signal supplied from a source and having recurring control periods, the combination including an element to which it is desired to apply a corrected signal, a capacitor connected in series with said source and said element, a junction transistor having base, emitter and collector electrodes, a charging and discharging circuit for said capacitor, said circuit being connected between said element and a point of reference potential and including the emitter-collector path of said junction transistor, biasing means connected between said base electrode and said point of reference potential for biasing said base electrode in the reverse direction such as to render the emitter-collector path of said junction transistor normally nonconductive, and keying means coupled to said base electrode for rendering said emitter-collector path conductive during a portion of each of said control periods, said keying means applying a keying pulse to said base electrode to overcome said reverse bias during each of said control period portions, said emitter-collector path completing a charging circuit for said capacitor when the potential difference between the potential of said element and said reference potential is of one polarity during a control period portion, and said emitter-collector path completing a discharging circuit for said capacitor when said potential difference is of the opposite polarity to said one polarity during a control period portion.

2. In a television system including a source of video signals the direct current component of which has been at least partially removed, an element to which it is desired to apply corrected video signals, and a capacitor coupling said source to said element, the combination including a switching device comprising a body of semiconductive material having two zones of one conductivity type and a third zone of the opposite conductivity type between and in contact with said two zones, means for applying a bias in the reverse direction between said third zone and one of said two zones, means for connecting said one of said two zones to a point of reference potential, means for connecting the other of said two zones to said element, and means coupled to said third zone to apply thereto keying pulses for periodically overcoming the bias in the reverse direction whereby current may flow between said two zones of said switching device in a first direction when the signal potential at said element exceeds said reference potential and in a direction opposite to said first direction when said reference potential exceeds the signal potential at said element.

3. A television system in accordance with claim 2 wherein said video signals have recurring control periods and wherein said keying pulses are applied to said third zone only during a portion of each of said control periods.

4. In a television receiver including a video amplifier, an electron discharge device having a control electrode, and a capacitor coupling said video amplifier to said control electrode, a clamp circuit including a switching device comprising a body of semiconductive material having two zones of one conductivity type and a third zone of the opposite conductivity type between and in contact with said two zones, means for applying a bias in the reverse direction between said third zone and one of said two zones, means for connecting said one of said two zones to a point of reference potential, means for connecting the other of said two zones to said control electrode, a source of keying pulses, and means for coupling said source to said third zone, each of said keying pulses being of such polarity and amplitude as to overcome said reverse bias and permit current to flow between said two zones in a direction determined by the magnitude of the signal potential on said control electrode relative to said reference potential whereby said control electrode periodically is brought to said reference potential.

5. A television receiver in accordance with claim 4 wherein the video signal output of said video amplifier has recurring blanking intervals and wherein said keying pulses occur only during portions of said blanking intervals.

6. In a video signal translating system wherein a capacitor couples an output terminal of one stage of said system to an input terminal of a subsequent stage thereof, a keyed clamp circuit comprising a junction transistor having base, emitter and collector electrodes, means for connecting one of said emitter and collector electrodes to said input terminal, means for connecting the other of said emitter and collector electrodes to a point of reference potential, means for biasing said base electrode in the reverse direction so as to render the emitter-collector path of said junction transistor normally nonconducting, a source of keying pulses, means coupled between said source and said base electrode for applying said keying pulses to said base electrode in such a polarity as to periodically overcome the reverse bias, said emitter-collector path being periodically rendered conducting in response to said application of keying pulses to said base electrode, the direction of current flow in said emitter-collector path during each of the periods of conduction being dependent upon the polarity of potential difference between the signal potential at said input terminal and said reference potential during said period of conduction.

References Cited in the file of this patent

UNITED STATES PATENTS 2,728,857 Sziklai ---------------- Dec. 27, 1955

2,823,322 Trousdale -------------- Feb. 11, 1958